United States Patent
Shade

(10) Patent No.: US 7,441,102 B2
(45) Date of Patent: Oct. 21, 2008

(54) INTEGRATED CIRCUIT WITH FUNCTIONAL STATE CONFIGURABLE MEMORY AND METHOD OF CONFIGURING FUNCTIONAL STATES OF THE INTEGRATED CIRCUIT MEMORY

(75) Inventor: Douglas M. Shade, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 49 days.

(21) Appl. No.: 11/364,104

(22) Filed: Feb. 28, 2006

(65) Prior Publication Data

US 2007/0204140 A1 Aug. 30, 2007

(51) Int. Cl.
*G06F 9/00* (2006.01)
*G06F 12/00* (2006.01)

(52) U.S. Cl. .......................... 712/205; 712/225

(58) Field of Classification Search .................. 712/43, 712/205, 225, 226, 229, 230, 232; 711/1
See application file for complete search history.

(56) References Cited

U.S. PATENT DOCUMENTS

| 4,028,683 | A | 6/1977 | Divine et al. |
|---|---|---|---|
| 5,950,012 | A | 9/1999 | Shiell et al. |
| 5,983,337 | A * | 11/1999 | Mahalingaiah et al. ........ 712/32 |
| 6,016,270 | A | 1/2000 | Thummalapally et al. |
| 6,128,607 | A | 10/2000 | Nordin et al. |
| 6,240,040 | B1 | 5/2001 | Akaogi et al. |
| 6,246,634 | B1 | 6/2001 | Nojima |
| 6,397,313 | B1 | 5/2002 | Kasa et al. |
| 6,418,506 | B1 | 7/2002 | Pashley et al. |
| 6,470,414 | B2 | 10/2002 | Kuo et al. |
| 6,691,205 | B2 | 2/2004 | Zilberman |
| 6,788,612 | B2 | 9/2004 | Hsu et al. |
| 6,883,044 | B1 | 4/2005 | Roohparvar |
| 2002/0120810 | A1* | 8/2002 | Brouwer ..................... 711/103 |
| 2005/0146583 | A1 | 7/2005 | Silverbrook |
| 2005/0160316 | A1 | 7/2005 | Shipton |

* cited by examiner

Primary Examiner—David J Huisman
(74) Attorney, Agent, or Firm—Michael J. Balconi-Lamica

(57) ABSTRACT

An integrated circuit comprises a processor configured for fetching and executing opcodes, a system bus, and a memory coupled to the processor via the system bus. The memory includes logic circuitry for detecting functional states of the memory, wherein the memory (a) supplies one or more programmed opcodes in response to detection of first functional states of the memory, and (b) supplies a hard coded opcode in response to detection of second functional states of the memory. The second functional states of the memory can include one or more of erase, write, self-test, and check-sum. The first functional states of the memory can include a functional state other than a second functional state.

18 Claims, 2 Drawing Sheets

_US 7,441,102 B2_

INTEGRATED CIRCUIT WITH FUNCTIONAL STATE CONFIGURABLE MEMORY AND METHOD OF CONFIGURING FUNCTIONAL STATES OF THE INTEGRATED CIRCUIT MEMORY

BACKGROUND

The present disclosures relate to integrated circuits, and more particularly, to an integrated circuit with memory and a method of configuring a memory.

Generally, it is impossible for a processor to run from its conventional Flash memory if that same memory is busy. The memory may be busy in view of erasing, re-programming, check summing, etc. Opcode fetches from a busy flash are not allowed and typically return garbage or an Access Error interrupt. Any microcontroller application requiring mission mode reprogramming of Flash memory must therefore employ a microcontroller which includes a second physical block of program memory or a mechanism to stall the core while the Flash is busy. Requiring a second physical block of program memory is costly.

With advancements in integrated circuit technology, it would be desirable to obtain a reduction of die size and cost. However, a common approach to meeting a mission mode Flash reprogramming requirement is to provide a distinct Boot Flash or Program RAM block on the integrated circuit die. Such memory blocks consume significant die area, especially so when considering the very infrequent uses of such resources during the mission.

Accordingly, there is a need for an improved method and apparatus for overcoming the problems in the art as discussed above.

BRIEF DESCRIPTION OF THE DRAWINGS

The present invention is illustrated by way of example and not limited by the accompanying figures, in which like references indicate similar elements, and in which.

The use of the same reference symbols in different drawings indicates similar or identical items. Skilled artisans will also appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

A number of terms are used herein and can be generally defined as follows. An "opcode" can refer to the digital program command being operated on by a processor. A "BRA PC+0" opcode can refer to an opcode that causes the processor to branch back to the same location it is currently at and, basically, it causes the processor to march in place. A "hard coded" value can refer to an unchangeable data value such as a constant. Other interpretations may also be possible.

Figure 1:
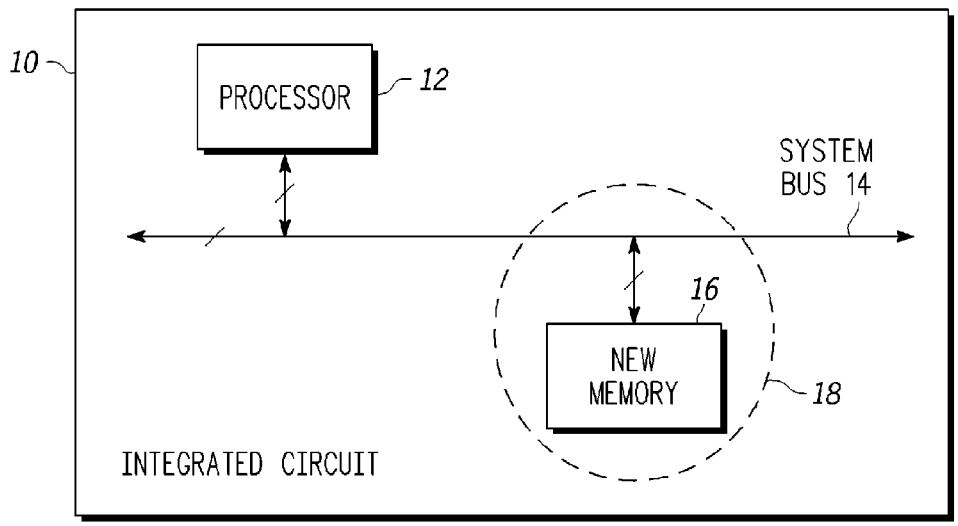
FIG. 1 is a block diagram view of an integrated circuit having memory according to one embodiment of the present disclosure.

FIG. 1 illustrates an integrated circuit (10) in which a processor (12) is coupled via a system bus (14) to a memory (16). The memory (16) includes novel functionality according to the embodiments of the present disclosure, as discussed further herein.

Figure 2:
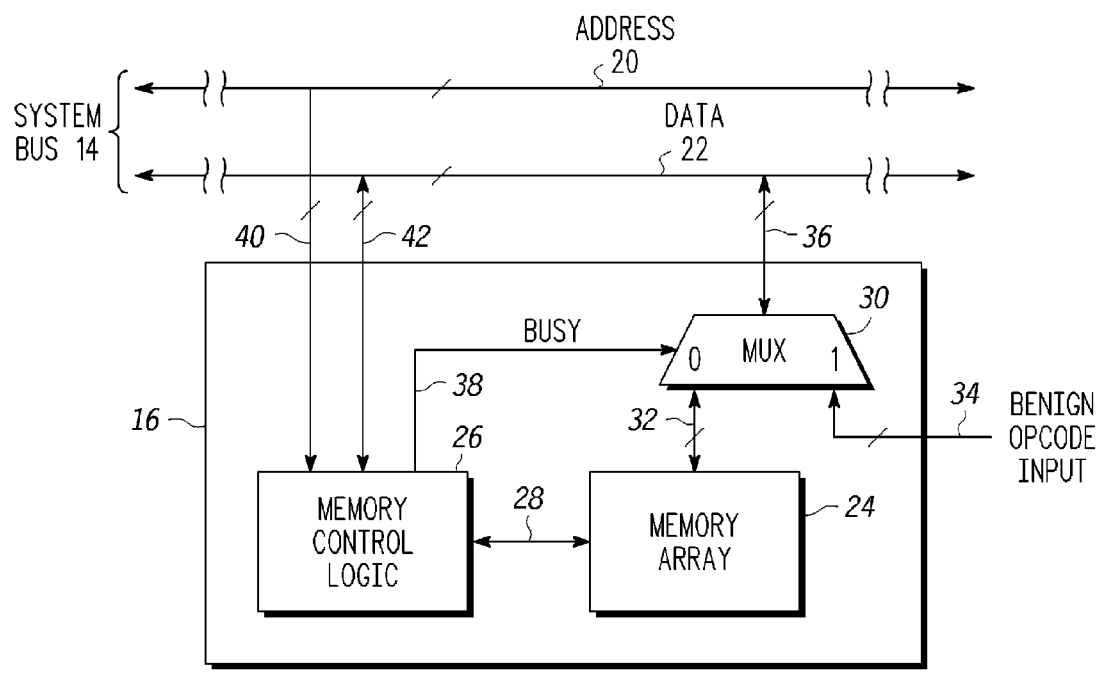
FIG. 2 is a block diagram view of a portion of the integrated circuit of FIG. 1 in greater detail, according to one embodiment of the present disclosure.

FIG. 2 illustrates the details associated with region (18) of FIG. 1. The system bus (14) generally comprises Address (20) and Data (22) segments. The address portion carries address information out from the processor to peripheral devices, e.g. memory (16). The data portion comprises a bi-direction bus (though it is sometimes implemented as a unidirectional read data and write data pair) that carries data to and from the processor (12). The memory (16) contains a memory array (24), associated control logic (26), and control signaling (28). The memory (16) also contains a multiplexer (30) which selects between its first port (32) and its second port (34) and routes one of these two ports to its output (36) based on the multiplexer control input (38). As part of the integration of the memory (16) into the integrated circuit (10), a hard-coded benign opcode, specific to the processor (12), is assigned to the benign opcode input port (34). The multiplexer control input (38) (a.k.a. "Busy" signal) is sourced by the memory control logic (26). Interface between the processor (12) and memory control logic is via the Address (40,20) and Data (42,22) components of the system bus (14).

Figure 3:
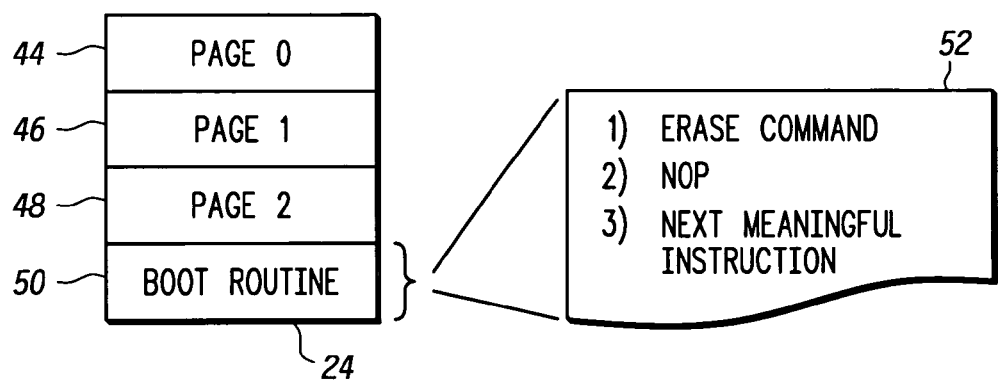
FIG. 3 is a block diagram view of the memory array of FIG. 2 in greater detail, according to one embodiment of the present disclosure.

FIG. 3 illustrates a typical application in which the memory (16) comprises a Flash type memory, in this case with four pages (44, 46, 48 and 50), any of which can be secured against erasure. In this example, the fourth page of memory (50) is secured from erasure, and contains a "Boot Routine" (52). This secured page of memory (50) contains a series of opcodes (i.e., processor instructions) that instructs the processor (12) to erase all of the unsecured Flash memory array (24), do nothing (i.e., the NOP instructions), and then continue on with the next meaningful instruction. The next meaningful instruction may include, for example, a check to ensure that the unsecured pages (44, 46, 48) were successfully erased, or a series of instructions to write fresh data into one of these erased pages.

This particular example, with respect to FIG. 3, assumes that the processor has an instruction pipeline, so as the "Erase Command" is executing, the NOP opcode is being decoded, and the processor is fetching a third instruction (i.e., a third opcode). Normally, the memory array (24) would be unable to provide valid data for this fetch, as it is "Busy" erasing. However, with the addition of the multiplexer (30), its control by the Busy signal (38), and the associated benign opcode input (34), the data portion of the system bus (22) is forced to a benign opcode value. A benign opcode is any instruction that once executed, the processor's program counter returns to the value it had prior to its execution.

Furthermore, in this example, the processor (12) accepts an opcode that results from the assembly of an instruction such as BRA PC+0 (e.g., branch to the current program counter plus zero). When a processor executes a BRA PC+0, it does very little useful processing. In other words, the processor essentially marches in place.

As a result, for as long as the memory array (24) is busy erasing, the processor (12) will be fetching the valid (but benign) substituted opcode and simply march in place. Once the memory array (24) completes the erase and the memory control logic (26) de-asserts Busy (38), the multiplexer (30) will revert back to its first port (32) and the processor will continue to fetch the opcodes contained in the "Boot Routine" (52), rather than the substituted benign opcode at (34).

Accordingly, the embodiments as discussed herein allow for the uninterrupted fetch and execution of opcodes from a memory (16), with no change in program (52) flow or suspension of processor (12) operation, even if the memory array (24) is not able to supply valid opcodes during certain functional states or conditions.

Expanding further on this specific example, the Boot Routine (52) may be any program which instructs the memory (16) to execute a behavior that will cause it to become unavailable to provide valid opcodes for any length of time, including but not limited to: mass erase, page erase, writes, checksum calculations over an address range, or MBIST (Memory Built In Self Test) operations.

In addition, the memory (16) is not restricted to paged Flash. The memory (16) may be of any type that may not be able to provide valid read access during certain operational states. These states may include: mass erase, page erase, writes, checksum calculations over an address range, or MBIST (Memory Built In Self Test) operations.

Furthermore, whenever a Flash memory is busy (e.g. erasing, programming, self verifying, etc.) and is unable to present a valid opcode in response to a read command, it instead responds with a (hard coded) benign opcode such as BRA PC+0. As a result, a boot (re-programming) program running from a protected segment of flash will occasionally "march in place" (i.e., fetch and execute BRA PC+0) while the flash memory is unable to respond to a read request with a real opcode.

According to one embodiment of the present disclosure, there is provided an integrated circuit comprising a processor configured for fetching and executing opcodes, a system bus, and a memory coupled to the processor via the system bus. The memory includes logic circuitry for detecting functional states of the memory and wherein the memory (a) supplies one or more programmed opcodes in response to detection of first functional states of the memory, and (b) supplies a hard coded opcode in response to detection of second functional states of the memory. In one embodiment, the memory comprises one or more of a Flash, RAM, MRAM, or other suitable memory. In another embodiment, the hard coded opcode is configured for enabling an uninterrupted fetch and execution of opcodes by the processor. In addition, the uninterrupted fetch and execution of opcodes by the processor occurs with neither (i) a change in a program flow or (ii) a suspension of processor operation.

In another embodiment, the integrated circuit includes a memory array, a multiplexer coupled to the memory array, and logic circuitry coupled to (a) the memory array and (b) the multiplexer. In addition, the multiplexer includes (i) a first bus port coupled to the memory array for receiving programmed opcodes stored in the memory array, (ii) a second bus port for receiving the hard coded opcode, (iii) a control input for receiving a functional state signal from the logic circuitry, and (iv) a multiplexer system bus port. Responsive to the functional state signal on the control input having a first state representative of the first functional states, the multiplexer couples the first bus port to the multiplexer system bus port. Responsive to the functional state signal on the control input having a second state representative of the second functional states, the multiplexer couples the second bus port to the multiplexer system bus port. In addition, the hard coded opcode can be stored (i) internal to the memory or (ii) external to the memory. Furthermore, the second functional states of the memory can represent one or more of erase, write, self-test, and check-sum, and wherein the first functional states of the memory can represent a functional state other than a second functional state. Still further, in one embodiment, the hard coded opcode comprises a benign opcode. In addition, the benign opcode can include, for example, a branch instruction.

In yet another embodiment, the processor further includes a program counter, and wherein the hard coded opcode comprises any opcode that results in the program counter of the processor remaining unchanged. For example, the opcode may include a branch instruction to a memory location given by a current program counter plus zero. In another embodiment, the memory includes a routine configured for placing the memory in a second functional state. For example, the routine can comprise one selected from the group consisting of a built-in self test, a check-sum routine, and a boot routine. In addition, the routine may reside in a protected portion of the memory.

In another embodiment of the present disclosure, an integrated circuit comprises a memory configured for being coupled via a bus to a processor. The processor is configured for fetching and executing opcodes. The memory includes logic circuitry for detecting functional states of the memory and wherein the memory (a) supplies one or more programmed opcodes in response to detection of first functional states of the memory, and (b) supplies a hard coded opcode in response to detection of second functional states of the memory. In addition, the hard coded opcode is configured for enabling uninterrupted fetch and execution of opcodes by the processor with either (i) no change in a program flow or (ii) no suspension of processor operation.

In a further embodiment of the integrated circuit, the memory includes a memory array and a multiplexer coupled to the memory array. The logic circuitry is coupled to (a) the memory array and (b) the multiplexer. The multiplexer includes (i) a first bus port coupled to the memory array for receiving programmed opcodes stored in the memory array, (ii) a second bus port for receiving the hard coded opcode, (iii) a control input for receiving a functional state signal from the logic circuitry, and (iv) a multiplexer system bus port. Responsive to the functional state signal on the control input having a first state representative of the first functional states, the multiplexer couples the first bus port to the multiplexer system bus port. Responsive to the functional state signal on the control input having a second state representative of the second functional states, the multiplexer couples the second bus port to the multiplexer system bus port. In addition, the hard coded opcode can be stored (i) internal to the memory or (ii) external to the memory.

According to another embodiment, there is provided a method of configuring a memory for being coupled via a bus to a processor, wherein the processor is adapted for fetching and executing opcodes from the memory. The method comprises detecting functional states of the memory with logic circuitry, supplying one or more programmed opcodes from the memory in response to detection of first functional states of the memory, and supplying a hard coded opcode from the memory in response to detection of second functional states of the memory. The hard coded opcode is configured for enabling uninterrupted fetch and execution of opcodes by the processor with either (i) no change in a program flow or (ii) no suspension of processor operation.

According to yet another embodiment of the method, configuring the memory further includes providing a memory array, coupling a multiplexer to the memory array, and coupling the logic circuitry to (a) the memory array and (b) the multiplexer. The multiplexer includes (i) a first bus port coupled to the memory array for receiving programmed opcodes stored in the memory array, (ii) a second bus port for receiving the hard coded opcode, (iii) a control input for receiving a functional state signal from the logic circuitry, and (iv) a multiplexer system bus port. Responsive to the functional state signal on the control input having a first state representative of the first functional states, the multiplexer couples the first bus port to the multiplexer system bus port. In addition, responsive to the functional state signal on the control input having a second state representative of the second functional states, the multiplexer couples the second bus port to the multiplexer system bus port. Furthermore, configuring the memory also includes storing the hard coded opcode (i) internal to the memory or (ii) external to the memory.

The embodiments of the present disclosure advantageously circumvent the need for either a second physical block of program memory or a mechanism to stall the core while a Flash memory is busy. The embodiments of the present disclosure further allow mission mode reprogramming of a single Flash block microcontroller.

In the foregoing specification, the disclosure has been described with reference to the various embodiments. However, one of ordinary skill in the art appreciates that various modifications and changes can be made without departing from the scope of the present embodiments as set forth in the claims below. Accordingly, the specification and figures are to be regarded in an illustrative rather than a restrictive sense, and all such modifications are intended to be included within the scope of the present embodiments.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the term "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An integrated circuit comprising:
   a processor configured for fetching and executing opcodes;
   a system bus; and
   a memory coupled to the processor via the system bus, the memory including logic circuitry for detecting functional states of the memory and wherein the memory (a) supplies one or more programmed opcodes in response to detection of first functional states of the memory, and (b) supplies a hard coded opcode in response to detection of second functional states of the memory, wherein the processor further includes a program counter, and wherein the hard coded opcode comprises any opcode that results in the program counter of the processor remaining unchanged, further wherein the hard coded opcode includes a branch instruction to a memory location given by a current program counter plus zero.

2. The integrated circuit of claim 1, wherein the hard coded opcode is configured for enabling an uninterrupted fetch and execution of opcodes by the processor.

3. The integrated circuit of claim 2, further wherein the uninterrupted fetch and execution of opcodes by the processor is with neither (i) a change in a program flow or (ii) a suspension of processor operation.

4. The integrated circuit of claim 1, wherein the memory includes a memory array, a multiplexer coupled to the memory array, and wherein the logic circuitry is coupled to (a) the memory array and (b) the multiplexer.

5. The integrated circuit of claim 4, wherein the multiplexer includes (i) a first bus port coupled to the memory array for receiving programmed opcodes stored in the memory array, (ii) a second bus port for receiving the hard coded opcode, (iii) a control input for receiving a functional state signal from the logic circuitry, and (iv) a multiplexer system bus port, wherein responsive to the functional state signal on the control input having a first state representative of the first functional states, the multiplexer couples the first bus port to the multiplexer system bus port, and wherein responsive to the functional state signal on the control input having a second state representative of the second functional states, the multiplexer couples the second bus port to the multiplexer system bus port.

6. The integrated circuit of claim 5, further wherein the hard coded opcode is stored (i) internal to the memory or (ii) external to the memory.

7. The integrated circuit of claim 1, wherein the second functional states of the memory represent one selected from the group consisting of erase, write, self-test, and check-sum, and wherein the first functional states of the memory represent a functional state other than a second functional state.

8. The integrated circuit of claim 1, wherein the hard coded opcode comprises a benign opcode.

9. The integrated circuit of claim 8, further wherein the benign opcode includes a branch instruction.

10. The integrated circuit of claim 1, wherein the memory includes a routine configured for placing the memory in a second functional state.

11. The integrated circuit of claim 10, further wherein the routine comprises one selected from the group consisting of a built-in self test, a check-sum routine, and a boot routine.

12. The integrated circuit of claim 1, wherein the memory comprises one selected from the group consisting of Flash, RAM, and MRAM.

13. An integrated circuit comprising:
    a processor configured for fetching and executing opcodes;
    a system bus; and
    a memory coupled to the processor via the system bus, the memory including logic circuitry for detecting functional states of the memory and wherein the memory (a) supplies one or more programmed opcodes in response to detection of first functional states of the memory, and (b) supplies a hard coded opcode in response to detection of second functional states of the memory, wherein the memory includes a routine configured for placing the memory in a second functional state, wherein the processor further includes a program counter, and wherein the hard coded opcode comprises any opcode that results in the program counter of the processor remaining unchanged, further wherein the hard coded opcode includes a branch instruction to a memory location given by a current program counter plus zero.

14. An integrated circuit comprising:
    a memory configured for being coupled via a bus to a processor that is configured for fetching and executing opcodes, the memory including logic circuitry for detecting functional states of the memory and wherein the memory (a) supplies one or more programmed opcodes in response to detection of first functional states of the memory, and (b) supplies a hard coded opcode in response to detection of second functional states of the memory, further wherein the hard coded opcode is configured for enabling uninterrupted fetch and execution of opcodes by the processor with either (i) no change in a program flow or (ii) no suspension of processor operation, wherein the memory includes a routine configured for placing the memory in a second functional state, wherein the processor further includes a program counter, and wherein the hard coded opcode comprises any opcode that results in the program counter of the processor remaining unchanged, further wherein the hard coded opcode includes a branch instruction to a memory location given by a current program counter plus zero.

15. The integrated circuit of claim 14, wherein the memory includes a memory array, a multiplexer coupled to the memory array, and wherein the logic circuitry is coupled to (a) the memory away and (b) the multiplexer, further wherein the multiplexer includes (i) a first bus port coupled to the memory away for receiving programmed opcodes stored in the memory array, (ii) a second bus port for receiving the hard coded opcode, (iii) a control input for receiving a functional state signal from the logic circuitry, and (iv) a multiplexer system bus port, wherein responsive to the functional state signal on the control input having a first state representative of the first functional states, the multiplexer couples the first bus port to the multiplexer system bus port, and wherein responsive to the functional state signal on the control input having a second state representative of the second functional states, the multiplexer couples the second bus port to the multiplexer system bus port.

16. The integrated circuit of claim 15, further wherein the hard coded opcode is stored (i) internal to the memory or (ii) external to the memory.

17. A method of configuring a memory for being coupled via a bus to a processor, the processor being configured for fetching and executing opcodes from the memory, the method comprising:

detecting functional states of the memory with logic circuitry;

supplying one or more programmed opcodes from the memory in response to detection of first functional states of the memory; and supplying a hard coded opcode from the memory in response to detection of second functional states of the memory, wherein the hard coded opcode is configured for enabling uninterrupted fetch and execution of opcodes by the processor with either (i) no change in a program flow or (ii) no suspension of processor operation, wherein the memory includes a routine configured for placing the memory in a second functional state, wherein the processor further includes a program counter, and wherein the hard coded opcode comprises any opcode that results in the program counter of the processor remaining unchanged, further wherein the hard coded opcode includes a branch instruction to a memory location given by a current program counter plus zero.

18. The method of claim 17, wherein configuring the memory further includes:

providing a memory array;

coupling a multiplexer to the memory array;

coupling the logic circuitry to (a) the memory array and (b) the multiplexer, wherein the multiplexer includes (i) a first bus port coupled to the memory array for receiving programmed opcodes stored in the memory array, (ii) a second bus port for receiving the hard coded opcode, (iii) a control input for receiving a functional state signal from the logic circuitry, and (iv) a multiplexer system bus port, wherein responsive to the functional state signal on the control input having a first state representative of the first functional states, the multiplexer couples the first bus port to the multiplexer system bus port, and wherein responsive to the functional state signal on the control input having a second state representative of the second functional states, the multiplexer couples the second bus port to the multiplexer system bus port; and storing the hard coded opcode (i) internal to the memory or (ii) external to the memory.

\* \* \* \* \*